United States Patent
Fukuda et al.

[11] Patent Number: 5,769,907
[45] Date of Patent: Jun. 23, 1998

[54] METHOD FOR PRODUCING ALUMINUM ELECTROLYTIC CAPACITOR

[75] Inventors: Morihiro Fukuda; Ichirou Yamashita, both of Yamaguchi; Yasushi Kurasaki, Yoshiki-gun, all of Japan

[73] Assignee: Matsushita Electric Industrial Co., Ltd., Osaka-fu, Japan

[21] Appl. No.: 521,683

[22] Filed: Aug. 31, 1995

[30] Foreign Application Priority Data

Feb. 7, 1995 [JP] Japan ..................................... 7-019377

[51] Int. Cl.6 .................................................. H01G 9/15
[52] U.S. Cl. .................................................. 29/25.03
[58] Field of Search .......................... 29/25.03; 361/520, 361/529, 538, 539

[56] References Cited

U.S. PATENT DOCUMENTS 4,591,951  5/1986  Iwamoto et al. .

FOREIGN PATENT DOCUMENTS

| | | |
|---|---|---|
| 1-033914 | 2/1989 | Japan . |
| 1-042811 | 2/1989 | Japan . |
| 1-071114 | 3/1989 | Japan . |

*Primary Examiner*—John Niebling
*Assistant Examiner*—Thomas G. Bilodeau
*Attorney, Agent, or Firm*—St. Onge Steward Johnston & Reens LLC

[57] ABSTRACT

A method for producing aluminum electrolytic capacitors by inserting a pair of lead wires extended from an end surface of a capacitor body into through holes provided in an insulation board, by bending the pair of lead wires to fit uniformly in the grooves formed on the bottom surface of the insulation board, and by cutting projected portions of the pair of lead wires projecting from the brim face of the insulation board.

4 Claims, 10 Drawing Sheets

METHOD FOR PRODUCING ALUMINUM ELECTROLYTIC CAPACITOR

FIELD OF THE INVENTION AND RELATED ART STATEMENT

1. Field of the Invention

The present invention relates to a method for producing aluminum electrolytic capacitors for use for various electronic apparatuses.

2. Description of the Prior Art

A conventional chip type aluminum electrolytic capacitor (approximately 3 to 10 mm in diameter) has been structured as shown in FIG. 11 (sectional view) and FIG. 12 (perspective view). A capacitor element 1 of the conventional aluminum electrolytic capacitor comprises an anode foil which is made by electrochemically roughening the surface of a high-purity aluminum foil and then subjecting the aluminum foil to anodic oxidation so as to form an oxidized dielectric film, and a cathode foil which is made by roughening the surface of an aluminum foil. The capacitor element 1 has such a configuration that the anode foil and the cathode foil are wound with the electrolytic paper intervening between the two foils. After the capacitor element 1 is impregnated with electrolytic liquid for driving, the capacitor element 1 is housed in a case 2 having a form of cylinder with a bottom. A pair of lead wires 3 are connected to the anode foil and the cathode foil of the capacitor element 1. A sealing member 4 made of rubber is inserted in the opening end of the case 2. By subjecting the case 2 to a drawing step, the opening end of the case 2 is sealed by the sealing member 4. The capacitor body 5 of the conventional aluminum electrolytic capacitor is structured as described above. The pair of lead wires 3 connected to the anode foil and the cathode foil of the capacitor element 1 pass through the sealing member 4 made of rubber and are extended externally from the outer end surface of the sealing member 4.

The outer end surface, from which the pair of lead wires 3 of the capacitor body 5 are extended, is provided with an insulation board 6. The insulation board 6 has through holes 6a through which the pair of lead wires 3 pass. Concave portions 6b connecting with the through holes 6a are formed on the bottom surface of the insulation board 6. The tip parts of the pair of lead wires 3 passing through the through holes 6a are bent so as to fit in the concave portions 6b.

The insulation board 6 has been mounted on the capacitor body 5 by using the steps shown at PART A to PART G in FIG. 13. In the capacitor body 5 shown at PART A in FIG. 13, a pair of lead wires 3 of each other different lengths are extended from the outer end surface of the capacitor body 5 so as to give identification of polarities. As shown at PART B in FIG. 13, the pair of lead wires 3 having different lengths are first cut to each other same lengths of the projected lead wires 3. As shown at PART C and PART D in FIG. 13, the pair of lead wires 3 are then inserted into the insulation board 6 so that the lead wires 3 pass through the through holes 6a of the insulation board 6. As shown at PART E in FIG. 13, the tip parts of the pair of lead wires 3 are then pulled slightly outwards so as to hold the insertion condition of the pair of lead wires 3 to the insulation board 6. The pair of lead wires 3 are then cut to a predetermined length as shown at PART F in FIG. 13. In the end, as shown at PART G in FIG. 13, the pair of lead wires 3 cut to the predetermined length are bent and fit in the concave portions 6b of the insulation board 6. By taking the above-mentioned processes, the insulation board 6 has been mounted on the capacitor body 5.

In the conventional method for producing the chip type aluminum electrolytic capacitors as descried above, the pair of lead wires 3 were inserted in the through holes 6a of the insulation board 6 and pass through the insulation board 6. The pair of lead wires 3 were then bent slightly outwards thereby to hold the inserted state of the pair of lead wires 3. In this position, the pair of lead wires 3 were cut to predetermined length. Therefore, in the conventional method, the cutting lengths of the pair of lead wires 3 were apt to have various values. As a result, the projected lengths of the pair of lead wires 3 projecting radially outward from the brim face of the insulation board 6 had various values, after the pair of lead wires 3 were bent so as to fit the lead wires 3 in the concave portions 6b of the insulation board 6.

OBJECT AND SUMMARY OF THE INVENTION

The present invention is intended to solve the above-mentioned problem encountered in the conventional method. The object of the invention is to provide a method for producing aluminum electrolytic capacitors, wherein the lengths of the pair of lead wires projecting from the brim face of the insulation board are not uniform and constant.

In order to achieve the above-mentioned object, a method for producing aluminum electrolytic capacitors in accordance with the present invention comprises the following steps:

encapsulating a capacitor element in a cylindrical case from an opening of the cylindrical case, sealing the openings by a sealing member so as to lead out a pair of lead wires from the capacitor element, cutting the pair of lead wires at predetermined lengths of the pair of lead wires extended from an end surface of the capacitor body, mounting an insulation board with through holes onto the opening, so as to make contact with the end surface of the capacitor body and making the pair of lead wires pass through the through holes, the insulation board having grooves on an external surface so as to connect with the through holes, bending the pair of lead wires so as to fit in the grooves, cutting off projected portions of the pair of lead wires which have been bent to fit in the grooves, at the parts projecting over brim face of the insulation board.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DESCRIPTION OF PREFERRED EMBODIMENTS

Hereafter, an embodiment of the present invention are described with referring to the accompanying drawings.

Figure 1:
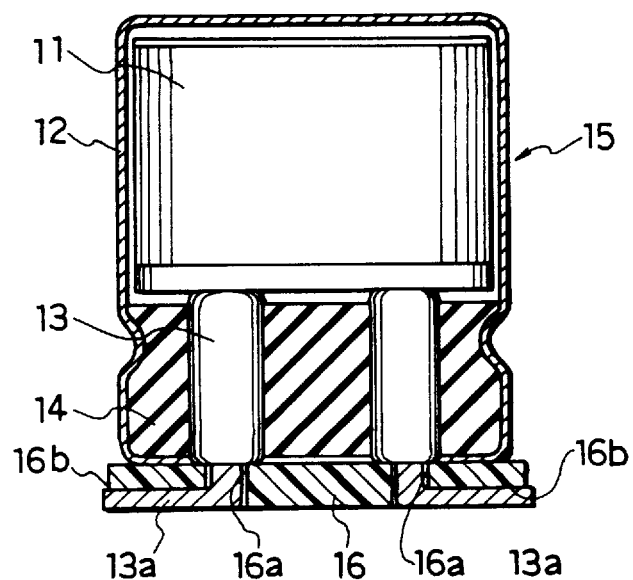
FIG. 1 is a sectional side view of a chip type aluminum electrolytic capacitor in accordance with an embodiment of the present invention.
Figure 2:
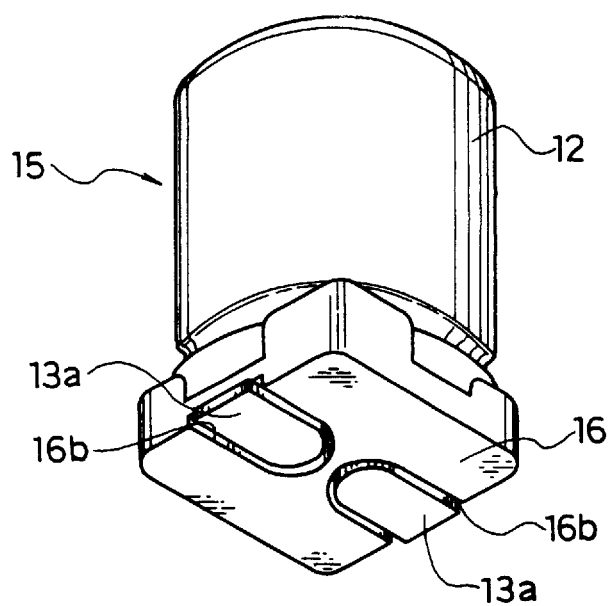
FIG. 2 is a perspective view of the chip type aluminum electrolytic capacitor shown in FIG. 1.

FIGS. 1 and 2 show a chip type aluminum electrolytic capacitor of the embodiment in accordance with the present invention. FIG. 1 is a sectional view of the aluminum electrolytic capacitor of the embodiment, and FIG. 2 is a perspective view of the aluminum electrolytic capacitor shown in FIG. 1.

In FIGS. 1 and 2, the aluminum electrolytic capacitor comprises a capacitor element 11 configured by cylindrically winding an aluminum anode foil, an aluminum cathode foil and an electrolytic paper. The anode foil and the cathode foil convolutely wound so as to face each other through the electrolytic paper intervening between the anode foil and the cathode foil.

The anode foil is made by electrochemically roughening the surface of a high-purity aluminum foil and then subjecting the aluminum foil to anodic oxidation to form an oxidized dielectric film. The cathode foil is made by roughening the surface of an aluminum foil. After impregnating the capacitor element 11 with electrolytic liquid for driving, the capacitor element 11 is encapsulated in a case 12 made of aluminum. The case 12 has a form of cylinder with a bottom. A pair of lead wires 13 are connected to the anode foil and the cathode foil of the capacitor element 11. A sealing member 14 made of elastic material such as natural rubber or synthetic rubber is inserted in the opening end of the case 12. By subjecting the external circumference of the case 12 to a drawing step, the opening end of the case 12 is sealed by the sealing member 14. The pair of lead wires 13 connected to the anode foil and the cathode foil of the capacitor element 11 pass through the sealing member 14 and are extended externally from the outer end surface of the sealing member 14. An insulation board 16 is disposed tightly contacting the end surface of a capacitor body 15 from which the pair of lead wires 13 are extended. The insulation board 16 has a rectangle shape and is made of resin having heat resistance, such as polyphenylene sulfide. The insulation board 16 has through holes 16a through which the pair of lead wires 13 pass. Flat grooves 16b connecting with the through holes 16a are formed on the bottom surface of the insulation board 6 so as to receive flatted parts of the lead wires 13. The projected portions of the pair of lead wires 13, which have passed through the through holes 16a, are bent outward so as to fit in the grooves 16b.

Figure 3:
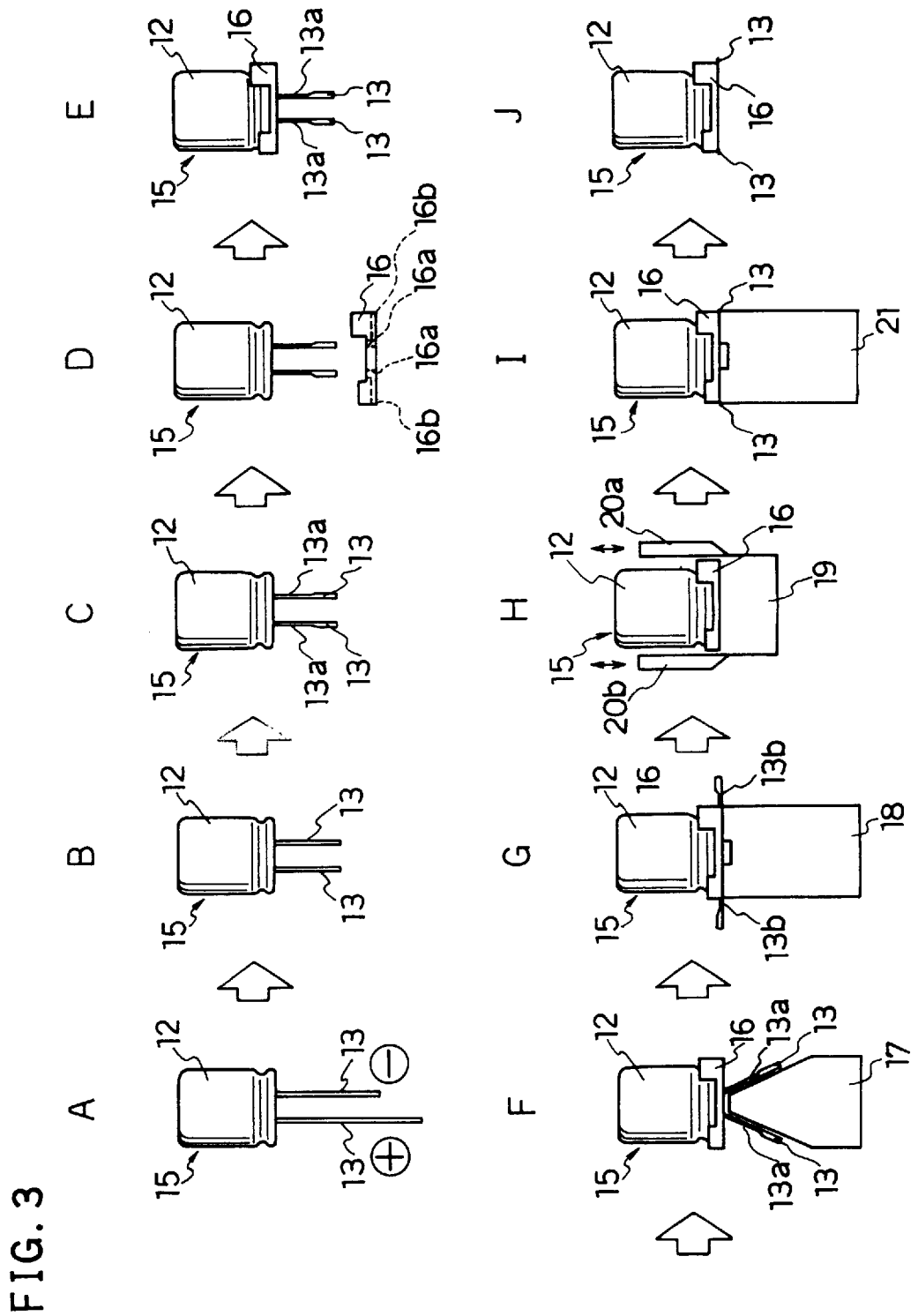
FIG. 3 is a process chart showing steps for producing the aluminum electrolytic capacitor shown in FIG. 1.
Figure 4:
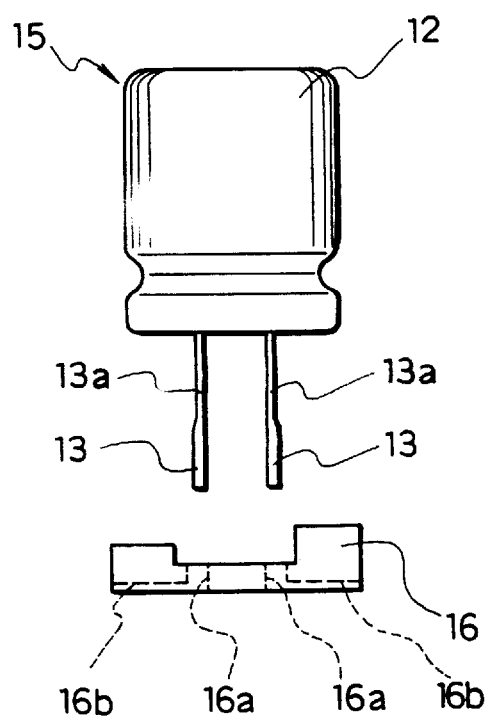
FIG. 4 is an enlarged front view showing an inserting step of the processes of FIG. 3.

FIG. 3 is a process chart illustrating steps for mounting the insulation board 16 on the capacitor body 15 in the production processes for the chip type aluminum electrolytic capacitor embodying the present invention. The pair of lead wires 13 extended through the outer end surface of the capacitor body 15 shown at PART A in FIG. 3 and having each-other different lengths are cut so as to have the same lengths of the projected lead wires 13 as shown at PART B in FIG. 3. The intermediate portions of the pair of lead wires 13 are then pressed as shown at PART C in FIG. 3, thereby forming flat portions 13a. The pair of lead wires 13 are then inserted and passed through the through holes 16a of the insulation board 16 as shown at PART D and PART E in FIG. 3. FIG. 4 is an enlarged front view showing the inserting step shown at PART D in FIG. 3. As shown in FIG. 4, the tip parts of the pair of lead wires 13 have round rod portions and are inserted into the through holes 16a of the insulation board 16. A core mold 17 is then inserted between the pair of lead wires 13 as shown at PART F in FIG. 3 and the pair of lead wires 13 are pushed slightly outward, thereby to keep the insertion condition of the pair of lead wires 13 into the insulation board 16. The flat portions 13a of the lead wires 13 are then bent by a lead bending plate mold 18 so as to fit in the flat grooves 16b provided on the bottom surface of the insulation board 16 as shown at PART G in FIG. 3. A lower cutter 19 is made contact with the bottom surface of the insulation board 16 as shown at PART H in FIG. 3. In this condition, the projected portions 13b of the pair of lead wires 13, which are shown at PART G in FIG. 3 and projected from the brim face of the insulation board 16, are cut with upper cutters 20a, 20b. The bent portions of the pair of lead wires 13 slightly stick out from the grooves 16b to the bottom surface of the insulation board 16 due to stress or burrs, which are likely generated at the time of cutting shown at PART H in FIG. 3. The bent portion of the pair of lead wires 13 are bent again by using a lead holding plate 21 as shown at PART I in FIG. 3, so as to fit in the grooves 16b. The chip type aluminum electrolytic capacitor shown at PART J in FIG. 3 is completed by the above-mentioned steps.

Figure 5:
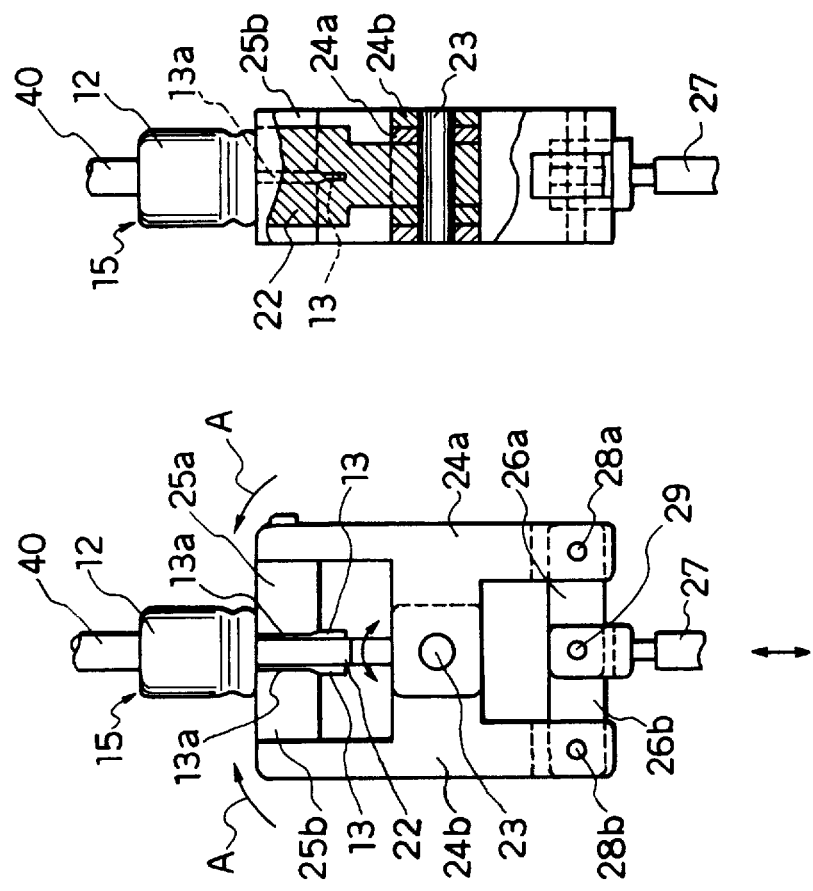
FIG. 5A is a front view of a pressing apparatus for pressing an intermediate portions of lead wires of the aluminum electrolytic capacitor shown in FIG. 1 to form flat sections of the lead wires.
FIG. 5B is a side sectional view of the pressing apparatus shown in FIG. 5A.
Figure 6:
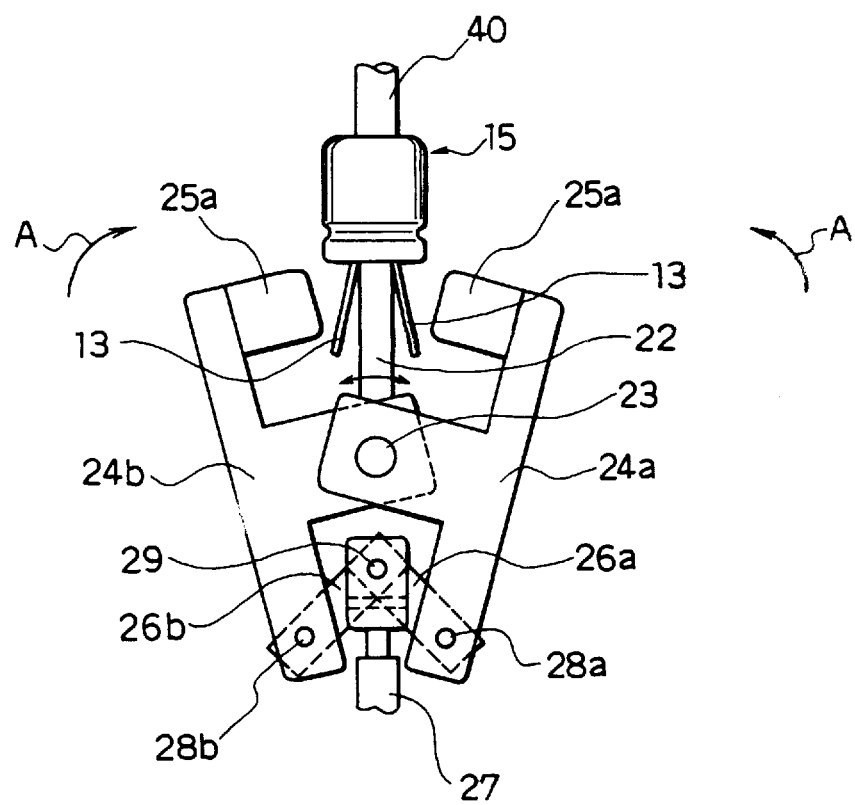
FIG. 6 is a front view showing an initial state of the pressing apparatus shown in FIG. 5A.
Figure 7:
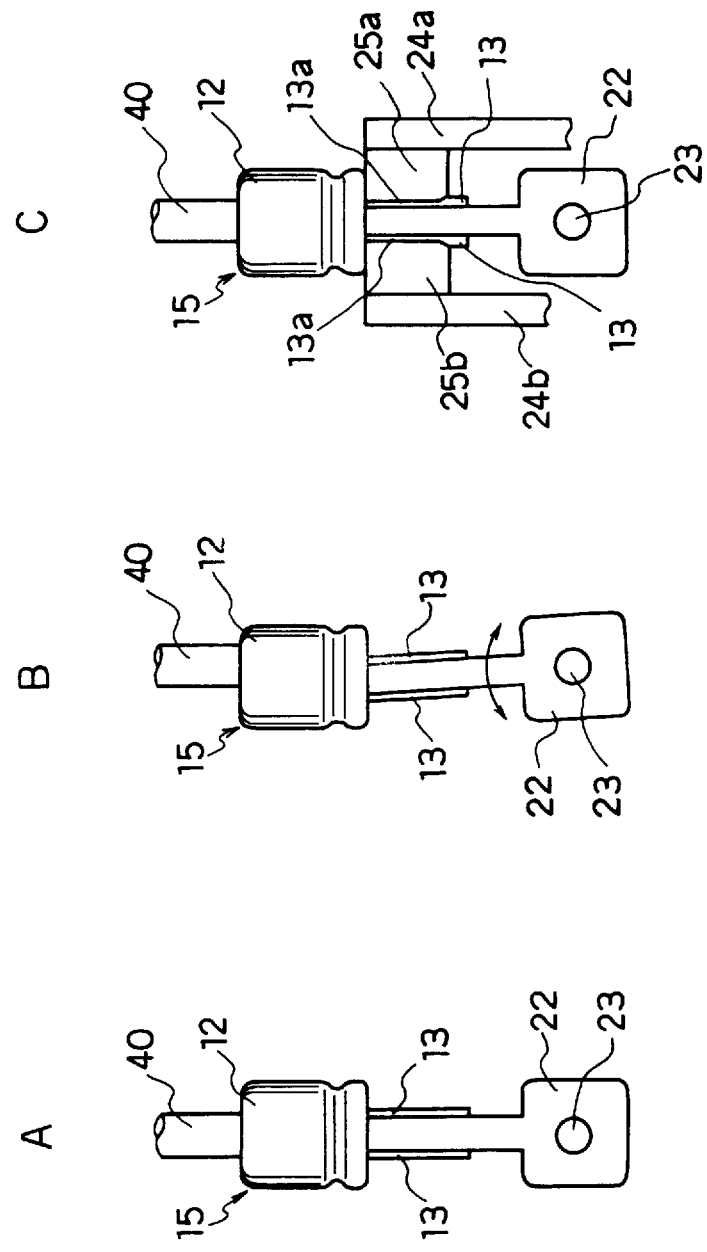
FIG. 7 is a plan view showing a pressing state of the pressing apparatus shown in FIG. 5A.

In the processes for mounting the insulation board 16 of the chip type aluminum electrolytic capacitor, shown as the embodiment of the present invention, the mechanism of the pressing apparatus used to form the flat portions 13a by pressing the intermediate portions of the pair of lead wires 13 shown at PART C in FIG. 3 is shown together with the capacitor body 15 in FIGS. 5A, 5B, 6 and 7. FIG. 5A is a front view of the pressing apparatus. FIG. 5B is a side sectional view of the pressing apparatus shown in FIG. 5A. FIG. 6 is a front view showing the initial condition of a pressing process wherein the capacitor body 15 is set in the pressing apparatus. FIG. 7 is a segmentary view showing the relationship between a pressing mold core 22 of the pressing apparatus and the capacitor body 15.

As shown in FIGS. 5A and 6, in this pressing step, the pressing mold core 22 is inserted between the pair of lead wires 13 extended from the outer end surface of the capacitor body 15 to support the pair of lead wires 13. One end of the pressing mold core 22 is rotatably supported by a fulcrum pin 23. Therefore, the tip of the pressing mold core 22 is made rotatably around the fulcrum pin 23.

As shown in FIGS. 5A and 6, a pair of chucks 24a, 24b are provided on the pressing apparatus and the chucks 24a, 24b are rotatably supported by the fulcrum pin 23 at the substantial center of the chucks 24a, 24b. At the above-mentioned one ends (upper ends) of the chucks 24a, 24b, pressing members 25a, 25b are provided, which are used to form the flat portions 13a by pressing the intermediate portions of the pair of lead wires 13. The other ends (lower ends) of the chucks 24a, 24b are connected to a connecting rod 27 via chuck open/close lever 26a, 26b. The other ends (lower ends) of the chuck 24a, 24b are rotatably connected to the one ends of the chuck open/close lever 26a, 26b by support pins 28a, 28b. In addition, the other ends of the chuck open/close lever 26a, 26b and the one end (upper end) of the connecting rod 27 are rotatably connected by a support pin 29.

When forming the flat portions 13a by pressing the intermediate portions of the pair of lead wires 13 by using the above-mentioned pressing apparatus, the capacitor body 15 is placed at a predetermined position by contacting the capacity body 15 to a positioning pin 40. As shown in FIG. 6, the tip of the pressing mold core 22 is then inserted between the lead wires 13 of the capacitor body 15. By driving the connecting rod 27 downward in this insertion condition, the pair of pressing members 25a, 25b provided on the chucks 24a, 24b are driven via the chuck open/close levers 26a, 26b, and moved in the direction indicated by arrow A in FIG. 6. By this pressing operation, the intermediate portions of the pair of lead wires 13 are pressed, thereby forming the flat portions 13a. In this pressing step, when the capacitor body 15 is placed at the predetermined position as shown at PART A in FIG. 7, the working is made in a good order. However, in case that the center axis of the capacitor body 15 is not aligned with the center axis of the pressing mold core 22 as shown at PART B in FIG. 7, it becomes very difficult to insert the tip of the pressing mold core 22 between the pair of lead wires 13.

In order to solve this problem, the one end of the pressing mold core 22 is rotatably supported by the fulcrum pin 23 in the embodiment of the present invention so that the tip of the pressing mold core 22 can move loosely to some extent. According to the above-mentioned configuration of the pressing apparatus, even in case that the center axis of the capacitor body 15 is out of alignment with the center axis of the pressing mold core 22 as shown at PART B in FIG. 7, the tip of the pressing mold core 22 can be inserted easily between the pair of lead wires 13 without applying any excessive load to each of the pair of lead wires 13. Furthermore, the flat portions 13a having a uniform thickness can be formed in the intermediate portions of the pair of lead wires 13, by means of the pressing members 25a, 25b mounted on the one ends (upper ends) of the chucks 24a, 24b.

In the embodiment of the present invention, by the pressing step shown at PART C in FIG. 3 in the mounting processes of the insulation board 16 shown in FIG. 3 as described above, the intermediate portions of the pair of lead wires 13 are pressed so as to form the flat portions 13a, and that at the tip parts of the pair of lead wires 13 there are still kept round rod portions. Therefore, when inserting the pair of lead wires 13 into the insulation board 16, the tip parts of the pair of lead wires 13 hardly bend and hence can be inserted easily into the through holes 16a of the insulation board 16.

Figure 8:
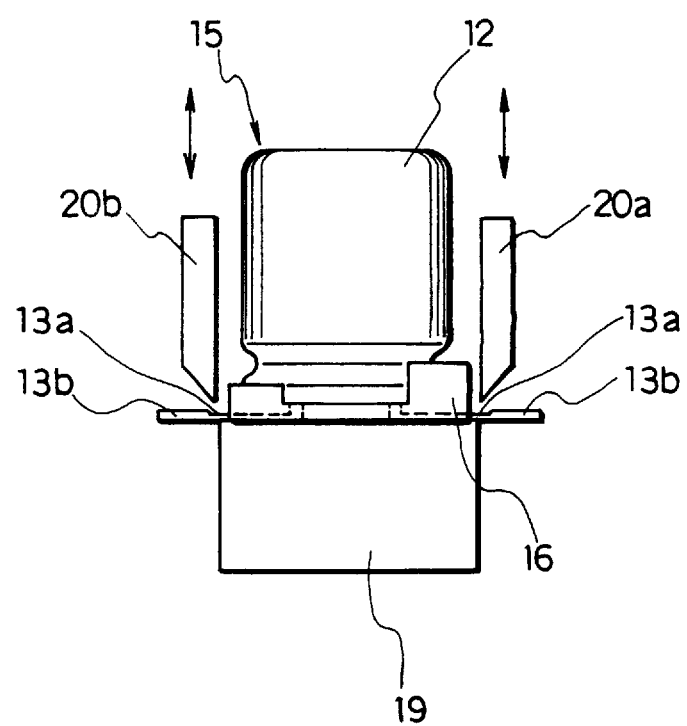
FIG. 8 is an enlarged front view showing a cutting step of the processes of FIG. 3.

Furthermore, in the embodiment of the present invention, the pair of lead wires 13 are bent by the lead-bending plate mold 18 so as to fit in the grooves 16b provided on the bottom surface of the insulation board 16 as shown at PART G in FIG. 3. FIG. 8 is an enlarged front view showing the cutting step shown at PART H in FIG. 3. As shown in FIG. 8, the lower cutter 19 is then made contact with the bottom surface of the insulation board 16 as shown at PART H in FIG. 3. In this state, the projected portions 13b of the pair of lead wires 13 projecting from the brim face of the insulation board 16 are cut or scissored off by the pull-down operation of the upper cutters 20a, 20b.

Figure 9:
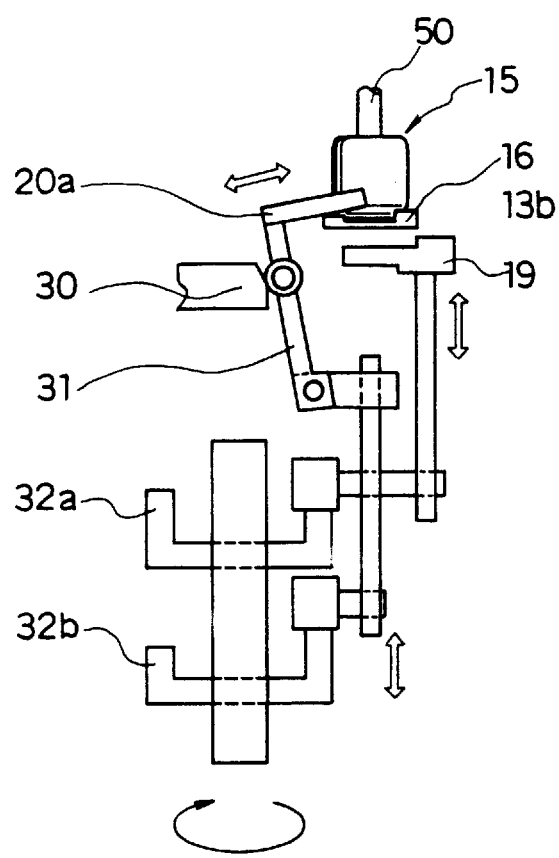
FIG. 9 is a side view showing a cutting apparatus used in the production processes for the aluminum electrolytic capacitor shown in FIG. 1.
Figure 10:
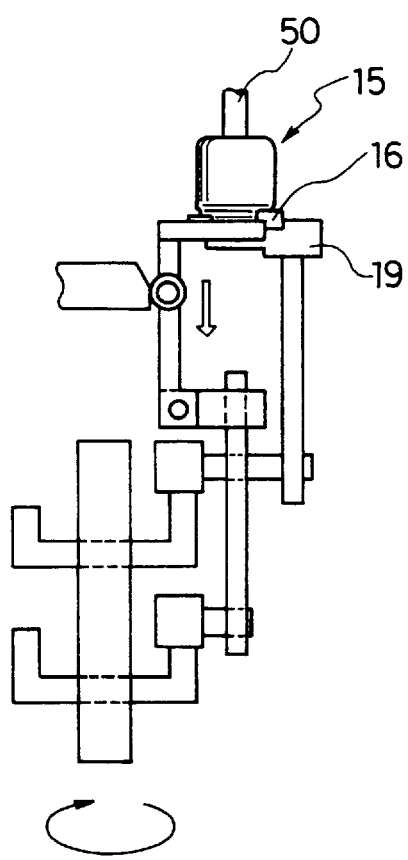
FIG. 10 is a side view showing a cutting condition of the cutting apparatus of FIG. 9.
Figure 11:
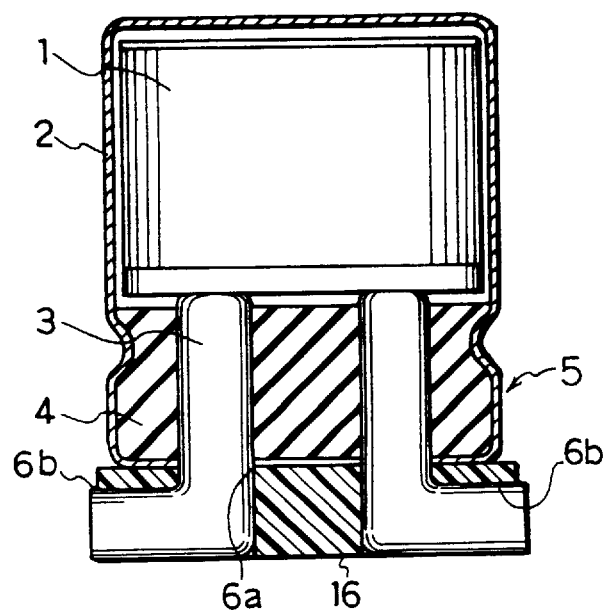
FIG. 11 is the sectional view showing the conventional chip type aluminum electrolytic capacitor.
Figure 12:
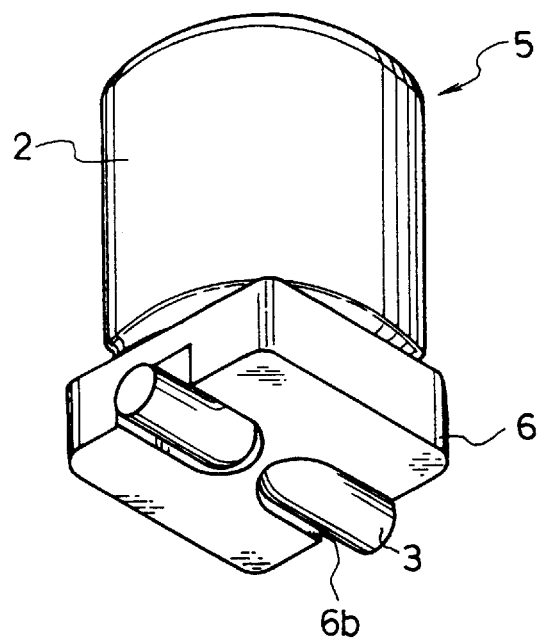
FIG. 12 is the perspective view showing the aluminum electrolytic capacitor shown in FIG. 11.
Figure 13:
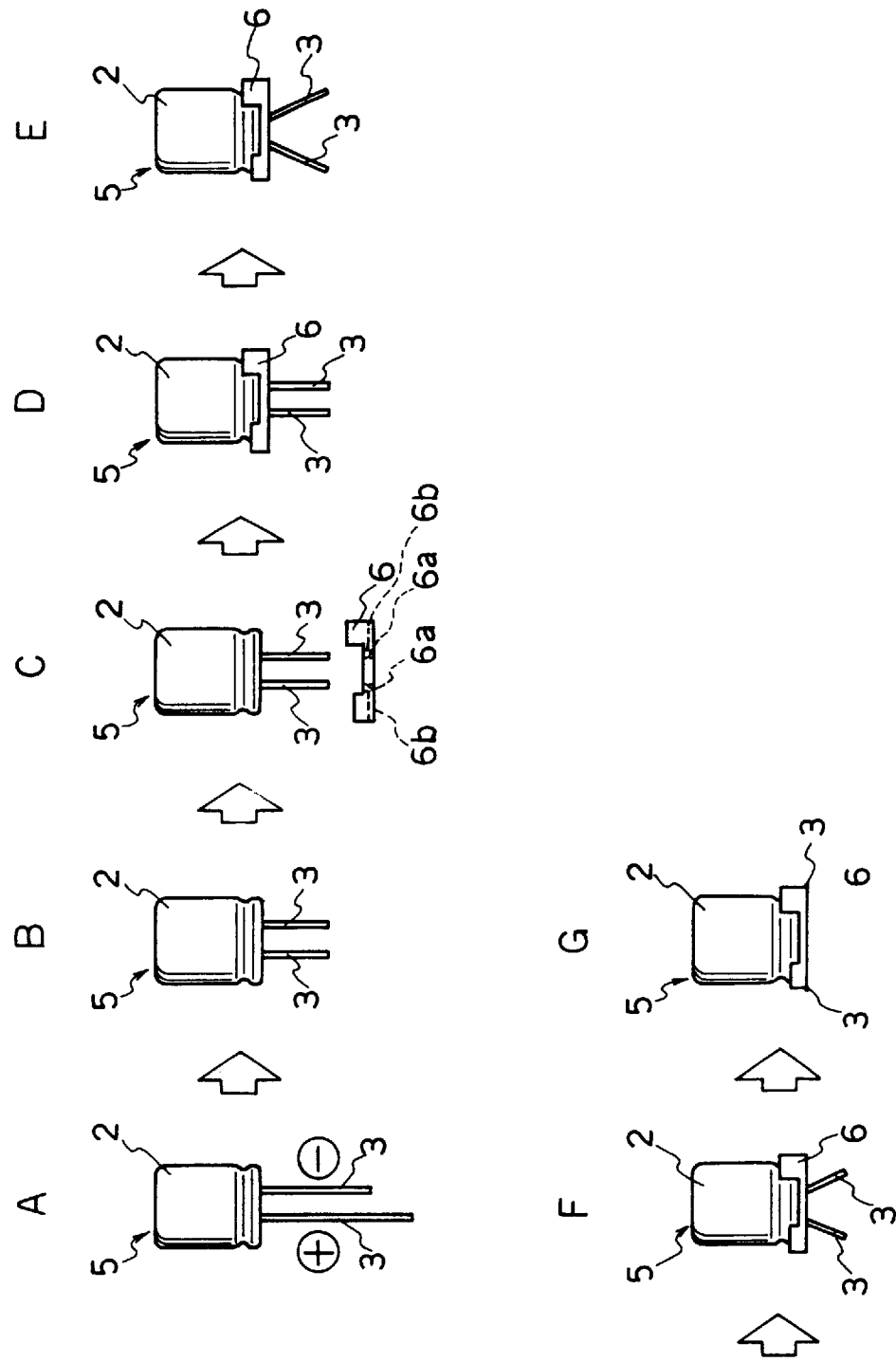
FIG. 13 is the process chart showing steps for producing the aluminum electrolytic capacitor shown in FIG. 11.

FIGS. 9 and 10 are diagrammatic side views showing the mechanism of the cutting apparatus used at PART H in FIG. 3. FIG. 9 is a diagrammatic view showing a condition when the capacitor body 15 is placed in the cutting apparatus. FIG. 10 is a diagrammatic view showing a cutting condition of the cutting apparatus. As shown in FIGS. 9 and 10, the lower cutter 19 is moved vertically by the rotation of a lower cutter-up/down cam 32a. The upper cutter 20a is moved vertically by the rotation of the upper cutter-up/down cam 32b. In addition, the upper cutter 20a is moved vertically via an upper cutter rocking lever 31. The upper cutter rocking lever 31 is actuated to be rotated on a circle segment in a counterclockwise direction (FIG. 9) by an actuating means, such as a spring. And, the upper cutting rocking lever 31 engages an upper cutter-rocking cam 30, which is linked with the upper cutter-up/down cam 32b. When the upper cutter 20a is moved upwardly, the upper cutter-rocking cam 30 is slid in a leftward direction in a predetermined interval as shown in FIG. 9. When the upper cutter 20a is moved downwardly, namely the lead wires 13 are cut, the upper cutter-rocking cam 30 is slid in a rightward direction in a predetermined interval as shown in FIG. 10. Therefore, in the above-mentioned cutting apparatus, when the upper cutter 20a moves upward, the upper cutter 20a evades the projected portions 13b of the lead wires 13.

In the cutting step shown in FIG. 9, when the capacitor body 15 is placed at the predetermined position by a positioning pin 50, the lower cutter 19 is pressed against the lower surface of the insulation board 16. The pull-down operation of the upper cutter 20a is then performed as shown in FIG. 10, and the projected portions 13b of the lead wires 13 are cut off. By conducting the cutting step by using the above-mentioned cutting apparatus, the lengths of the projected portions of the lead wires 13 projecting from the brim face of the insulation board 16 can be made uniform. This enables prevention of the variations in the projected lengths of the pair of lead wires 13, which are observed in the conventional production method.

Furthermore in the embodiment of the present invention, the lead holding plate 21 is used as shown at PART I in FIG. 3. And, in the cutting process shown at PART H in FIG. 3, the bent portions of the pair of lead wires 13 slightly sticking out from inside the grooves 16b to the bottom surface of the insulation board 16 are bent again so that the bent portions can fit in the grooves 16b. Since the bent portions of the lead wires 13 can fit uniformly in the grooves 16b of the insulation board 16 in this way, the chip type aluminum electrolytic capacitor produced by the method of the present invention can be mounted uniformly and properly when the aluminum electrolytic capacitor is mounted on a PC board by soldering. Moreover, since the bent portions of the lead wires 13 of the aluminum electrolytic capacitor produced by the above-mentioned production method are placed securely in the grooves 16b, it is possible to prevent the capacitor from inclined fixing at soldering.

As described above, in the method for producing aluminum electrolytic capacitors in accordance with the present invention, the pair of lead wires extended from the outer end surface of the capacitor body are inserted into the through holes of the insulation board. And that, bending operation is performed for the pair of lead wires so that the lead wires can fit in the grooves on the bottom surface of the insulation board, and cut-off operation is performed so as to cut off the portions of the lead wires, which are bent to fit in the grooves of the insulation board and projected from the end surface of the insulation board. For this reason, according to the method for producing aluminum electrolytic capacitors of the present invention, the projected lengths of the lead wires from the brim face of the insulation board can be made uniform. Thereby, the hitherto observed variations of the projected lengths of the lead wires are prevented.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A method for producing aluminum electrolytic capacitors comprising the steps of:

encapsulating a capacitor element in a cylindrical case from an opening of said cylindrical case, sealing said openings by a sealing member so as to lead out a pair of lead wires from said capacitor element thereby forming a capacitor body, cutting said pair of lead wires at predetermined lengths of said pair of lead wires extended from an end surface of said capacitor body, mounting an insulation board with through holes onto said opening, so as to make contact with said end surface of said capacitor body and making said pair of lead wires pass through said through holes, said insulation board having grooves on an external surface so as to connect with said through holes, bending said pair of lead wires so as to fit in said grooves, and cutting off projected portions of said pair of lead wires which have been bent to fit in said grooves, at the parts projecting over brim face of said insulation board.

2. A method for producing aluminum electrolytic capacitors comprising the steps of:

encapsulating a capacitor element in a cylindrical case from an opening of said cylindrical case, sealing said openings by a sealing member so as to lead out a pair of lead wires from said capacitor element thereby forming a capacitor body, cutting said pair of lead wires at predetermined lengths of said pair of lead wires extended from an end surface of said capacitor body, mounting an insulation board with through holes onto said opening, so as to make contact with said end surface of said capacitor body and making said pair of lead wires pass through said through holes, said insulation board having grooves on an external surface so as to connect with said through holes, bending said pair of lead wires so as to fit in said grooves, cutting off projected portions of said pair of lead wires which have been bent to fit in said grooves, at the parts projecting over brim face of said insulation board, and bending again bent portions of said pair of lead wires which slightly stick out from said grooves to said external surface of said insulation board due to said cutting step so that said bent portions fit in said grooves.

3. A method for producing aluminum electrolytic capacitors comprising the steps of:

encapsulating a capacitor element in a cylindrical case from an opening of said cylindrical case, sealing said openings by a sealing member so as to lead out a pair of lead wires from said capacitor element thereby forming a capacitor body, cutting said pair of lead wires at predetermined lengths of said pair of lead wires extended from an end surface of said capacitor body, forming flat portions by pressing intermediate portions of said pair of lead wires, which have been cut, and making a round rod portions at tip parts of said pair of lead wires having said flat portions to pass through and insert into through holes of an insulation board.

4. A method for producing aluminum electrolytic capacitors in accordance with claim 3, wherein said flat portions are formed by pressing said intermediate portions of said pair of lead wires by using a pressing apparatus comprising a pressing mold core which is inserted between said pair of lead wires of said capacitor body to support said pair of lead wires and pressing members which press said pair of lead wires supported by said pressing mold core by holding and pressurizing both sides of said lead wires to form said flat portions.

* * * * *